United States Patent [19]
Plunkett

[11] 3,765,552

[45] Oct. 16, 1973

[54] ROLL-IT-CONVEYOR SYSTEM FOR TRUCKS

[75] Inventor: Hugh J. Plunkett, New Haven, Conn.

[73] Assignee: The Raymond Lee Organization, Inc., New York, N.Y.

[22] Filed: Jan. 3, 1972

[21] Appl. No.: 214,569

[52] U.S. Cl............... 214/83.26, 214/84, 193/35 R
[51] Int. Cl.............................................. B60p 1/52
[58] Field of Search................. 214/85, 85.1, 83.34, 214/83.22, 83.26, 84, 83.24; 193/35 R

[56] References Cited
UNITED STATES PATENTS

| | | | |
|---|---|---|---|
| 276,685 | 5/1883 | Harley | 215/85 |
| 596,322 | 12/1897 | Carpenter, Sr. | 214/85 |
| 571,497 | 11/1896 | Powell | 214/85 |

*Primary Examiner*—Albert J. Makay
*Attorney*—Richard S. Shreve, Jr.

[57] ABSTRACT

A truck or trailer has a floor with a hollow bed thereunder. The floor has an opening communicating with the bed. A door is removably disposed in the opening. A conveyor is removably stored in the bed. The conveyor has a belt with articulated sections generally horizontally disposed end to end and also has rollers freely rotatable and disposed adjacent each section.

3 Claims, 5 Drawing Figures

PATENTED OCT 16 1973   3,765,552

ROLL-IT-CONVEYOR SYSTEM FOR TRUCKS

FIELD OF THE INVENTION

My invention is directed toward a conveyor system to be carried by trucks for ease in loading and unloading where facilities are not provided. My system forms an integral part of truck or trailer, is inexpensive, easily handled by the driver, can be used at any point in the truck body, and can be stored away, leaving the floor unencumbered, when not in use.

SUMMARY

To this end, I employ gravity operated roller skate wheels or full roller types. A flexible belt has these wheels or rollers mounted therein in such fashion as to interlock and to form a rigid platform in working position. The belt can act as a hinge when the conveyor is folded into a storage bed in the truck.

The storage space is mounted beneath the floor of the truck or trailer and comprises an enclosed bed onto which the conveyor can roll as it is folded through the floor. Ease of handling is assured since the wheels or rollers function as transportation means in taking the conveyor into and out of storage.

The end of the conveyor can have a recessed handle fitting into a plate forming part of the conveyor and flush with the floor so as not to interfere with fork trucks and the like. The unit can be mounted just forward of the rear undercarriage or with a side mounting either to the left or the right of the main frame.

DETAILED DESCRIPTION OF PREFERRED EMBODIMENTS

Figure 1:
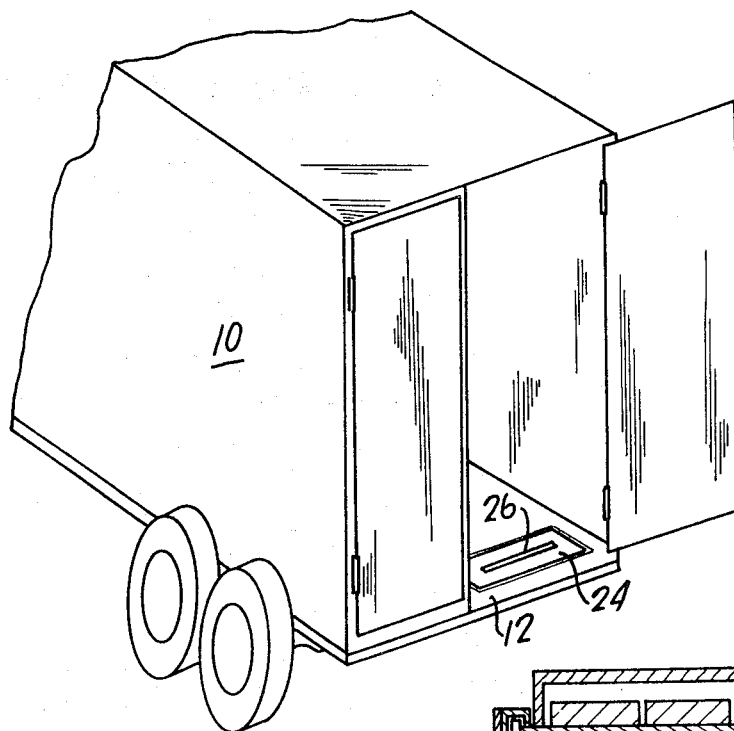
FIG. 1 is a perspective of the rear of a trailer using my invention.
Figure 5:
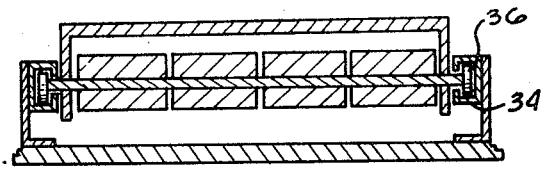
FIG. 5 is a detail of a portion of the structure shown in FIGS. 1–4.
Figure 2:
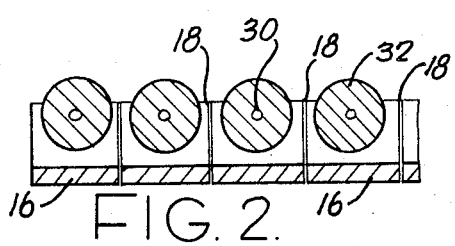
FIG. 2 is a side detail of my conveyor ready for use.
Figure 3:
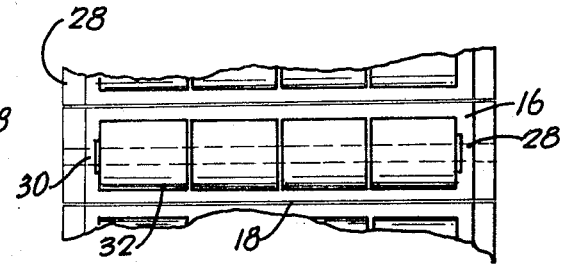
FIG. 3 is a top plan of the structure shown in FIG. 2.
Figure 4:
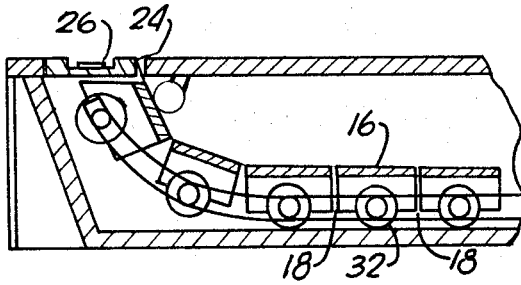
FIG. 4 is a cross section of my invention in storage position.

Referring now to FIGS. 1–5, a trailer 10 has a floor 12 with a hollow recess 14 disposed thereunder. A belt having a plurality of hinged or articulated flat sections 16 horizontally disposed end to end with vertical partition walls 18 is secured at one end via cable 20 to a reel 22 having powered or manually operable winding and unwinding means.

A removable plate 24 in the end of the conveyor and flush with the floor functions also as a door in the bed of the truck. A recessed handle 26 is disposed therein. Each pair of adjacent walls extends between end sections 28 oriented vertically at right angles to the walls. Each pair of sections 28 supports the ends of a shaft 30 extending horizontally therebetween. Rollers 32 rotatable about the shaft are disposed between each two walls 18.

With the rollers disposed below sections 18, the arrangement can be rolled into recess 14 and stored therein. When door 24 is removed, the belt and rollers can be pulled out and the belt pulled along the floor. The rollers are then disposed on top of the belt and can be used conventionally for conveying.

Rails 34 can be provided in the side of the storage bed to guide and support the conveyor. Skate wheels 36 can be mounted on leading outside edge of each section of the conveyor to feed into these rails.

While I have described my invention with particular reference to the drawings, such is not to be considered as limiting its actual scope.

Having thus described this invention, what is asserted as new is:

1. In a truck or trailer having a floor with a hollow bed thereunder, said floor having an opening communicating with the bed with a removable door therein;
   a conveyor removably stored in the bed, said conveyor having a belt with articulated sections generally horizontally disposed end to end and rollers freely rotatable and disposed adjacent each section; and
   winding and unwinding means in the bed and a cable securing one end of the conveyor to said means.

2. In a truck or trailer as set forth in claim 1 wherein the other end of the conveyor, when in the bed, is disposed adjacent said door.

3. In a truck or trailer as set forth in claim 2 wherein said door has a recessed handle.

* * * * *